United States Patent [19]
Go et al.

[11] Patent Number: 5,099,307
[45] Date of Patent: Mar. 24, 1992

[54] PROCESS FOR PRODUCING OPTICAL MODULE

[75] Inventors: Hisao Go; Yutaka Matsumura, both of Kanagawa, Japan

[73] Assignee: Sumitomo Electric Industries, Ltd., Osaka, Japan

[21] Appl. No.: 588,990

[22] Filed: Sep. 27, 1990

[30] Foreign Application Priority Data

Mar. 13, 1990 [JP] Japan ................................ 2-61919

[51] Int. Cl.$^5$ ..................... H01L 23/48; H01L 29/44; H01L 29/52; H01L 29/60
[52] U.S. Cl. ..................................................... 357/70
[58] Field of Search ...................... 357/70; 350/96.20

[56] References Cited

U.S. PATENT DOCUMENTS

| | | | |
|---|---|---|---|
| 4,725,692 | 2/1988 | Ishii et al. | 357/70 |
| 4,942,455 | 7/1990 | Shinohara | 357/70 |
| 4,951,120 | 8/1990 | Hagiwara et al. | 357/70 |
| 5,028,986 | 7/1991 | Sugano et al. | 357/70 |

Primary Examiner—William L. Sikes
Assistant Examiner—Robert E. Wise
Attorney, Agent, or Firm—Cushman, Darby & Cushman

[57] ABSTRACT

An optical sub-module comprises at least one optical connector; at least one optical operation element fixed to the optical connector; electronic circuit parts constituting an electronic circuit portion connected to the optical operation element; a substrate for supporting said electronic circuit parts; lead pins composed of inner leads and outer leads, inner leads being connected to electronic circuit portion; and a molding resin member holding the optical connector, the optical operation element, the electronic circuit parts, the substrate, and the lead pins in a body except for the outer leads of the lead pins and an end of the optical connector. An optical module comprises the sub-module and a molded receptacle having a first fitting portion into which the at least one optical connector is inserted so that the first fitting portion is fitted to the molding resin member, and a second fitting portion to which an optical plug holding the end of the optical fiber to be inserted in the optical connector, is fitted, the second fitting portion being communicated with the first fitting portion. The optical sub-module is formed through transfer molding.

4 Claims, 6 Drawing Sheets

PROCESS FOR PRODUCING OPTICAL MODULE

RELATED APPLICATIONS

This application is directed to subject matter that is generally related to the subject matter disclosed in the following U.S. application Ser. Nos.:
1) U.S. application Ser. No. 07/667,301;
2) U.S. application Ser. No. 07/670,421; and
3) U.S. application Ser. No. 07/573,583.

BACKGROUND OF THE INVENTION

The present invention relates to the production of an optical module used for optical communication system such as a data link and an optical LAN using light as data transmitting medium, more particularly to an optical sub-module including at least one optical operation element such as a light emitting element or a light receiving element which is optically connected to an optical fiber, an optical module comprising the sub-module and a receptacle.

A single-core optical sub-module including a single optical operation element optically connected to an optical fiber, is made into one of two types. That is, one is a transmission sub-module using a light emitting element such as a semiconductor laser as the optical operation element, and the other is a receiving sub-module using a light receiving element such as a pinphoto diode as the optical operation element.

FIG. 1 shows a conventional single-core optical sub-module. In the conventional single-core optical sub-module, after an optical axis of an optical operation element 2 such as a light emitting element or a light receiving element is aligned, the optical operation element is fixed to an optical connector 1 fitted to a ferrule (not shown) fixed to an end portion of an optical fiber (not shown) by an adhesive and the like. The optical connector 1 fixing the optical operation element 2 is fixed to a ceramic package 3 by an adhesive and the like. In addition to the optical connector 1, a substrate 6 supporting an electronic circuit portion composed of electronic circuit parts such as a bare chip IC 5 is fixed to the ceramic package 3. The bare chip IC 5 and the like on the substrate 6 as well as wires for connecting the bare chip IC to a wiring pattern of the substrate 6 are sealed by a lid 7. Also, the ceramic package 3 is provided with lead pins 8 including inner leads 8a provided inside the package and outer leads 8b provided outside the package. The inner leads 8a and the electronic circuit portion on the substrate 6, as well as the electronic circuit portion and a terminal of the optical operation element 2 are electrically connected by wire bonding and the like. Then, a cover 10 is fixed to the ceramic package 3 so that the single-core optical sub-module is constructed.

As shown in FIGS. 2 and 3, a plurality of thus constructed single-core optical sub-modules 11 are attached to a receptacle 12 so that a conventional multi-core optical module is constructed.

In the thus constructed multi-core optical module, optical fibers are concurrently inserted in the respective optical connectors 1 so that a plurality of data links are formed at the same time.

The single-core optical sub-module 11 is constructed by many elements, and each element is assembled one by one. Thus, assembling steps are complicated, and many steps are required for the assembling. Further, since expensive materials such as ceramic are used, it is difficult to lower the cost and to mass-produce the single-core optical sub-module.

On the other hand, the conventional multi-core optical module is constructed by combining a plurality of single-core optical sub-modules 11. Accordingly, it is also difficult to lower the cost and to mass-produce the multi-core optical module composed of the plurality of single-core optical sub-modules. Further, at the practical use, the optical connectors are attached to and off a multi-core plug having a plurality of ferrules in the receptacle 12. Thus, when the single-core optical modules 11 are attached to the receptacle 12, high accuracy of positioning is required. That is, if the positioning accuracy is insufficient, smooth attachment and detachment of the optical connectors become impossible. In the worst case, partial abrasion or damage of the ferrules of the plug or the optical connectors 1 is caused. The positioning accuracy must be high as the number of optical connectors included in the multi-core optical module increases. For the multi-core optical module with more than three cores, very high positioning accuracy is required. Accordingly, assembling portions of the single-core optical sub-module 11 and the receptacle must be formed at high accuracy, and at the assembling, as shown in FIGS. 2 and 3, an alignment tool 15 including the same number of ferrules 13 as the optical connectors of the multi-core optical module must be used to carry out precise positioning.

Further, as shown in FIG. 4, when the multi-core optical module precisely positioned as described above is mounted on a printed circuit board 16 by screwing, soldering or the like, relative positional relation between the single-core optical sub-modules 11 or between the sub-modules 11 and the receptacle 12 may be distorted. In order to solve the problem, the alignment tool 15 must be attached to the multi-core optical module until the multi-core optical module is completely mounted. Therefore, operational efficiency of the mounting is inferior.

SUMMARY OF THE INVENTION

It is therefore an object of the present invention to provide a low-cost method for mass-producing an optical sub-module and an optical module comprising the sub-module and a receptacle.

The optical sub-module of the present invention is provided with a molding resin member for holding in a body at least one optical connector, at least one optical operation element, electronic circuit parts, a substrate and lead pins except for one end of the at least one optical connector at which an end of an optical fiber is received and outer leads of the lead pins.

The process of producing the optical sub-module of the present invention comprises the steps of preparing a lead frame having a substrate formation portion formed into a substrate and lead pin formation portions formed into lead pins, forming an electronic circuit portion by mounting electronic circuit parts on the substrate formation portion of the lead frame, electrically connecting at least one optical operation element fixed to at least one optical connector and parts of the lead pin formation portions formed into inner leads to the electronic circuit portion, holding one end of the at least one optical connector with a mold die for resin molding, and holding the optical connector(s), the optical operation element(s), the electronic circuit parts, and the lead frame except for one end of the optical connector(s) at which an end of an optical fiber is received and parts of the lead frame formed into outer leads.

The optical module of the present invention comprises at least one optical connector, at one end of which an end of an optical fiber is received, a molding resin member made of a molding resin for holding the other end of the optical connector, and a receptacle including a first fitting portion into which the optical connector is inserted so that the first fitting portion is fitted to the molding resin member, and a second fitting portion fitting to an optical plug for holding an end of the optical fiber inserted into the optical connector and communicating with the first fitting portion.

According to the structure of the optical sub-module of the present invention, elements constituting the sub-module can be decreased. Also, assembling steps of the sub-module can be simplified.

According to the structure of the multi-core optical module of the present invention having more than two optical connectors, with the dimensional accuracy realized in the mold die used at the formation of the molding resin member, intervals between the plurality of optical connectors held by the molding resin member in a body are determined, and the outer dimension of the molding resin member and relative positional relation of the optical connectors to the outer figure of the connector holder member are determined. Further, with the dimensional accuracy realized in the mold die used at the formation of the receptacle, the inner dimension of the receptacle is determined. Accordingly, the fitting accuracy of the molding resin member and the receptacle is also determined by the dimensional accuracy realized in the mold dies. The relative positional accuracy of the optical connectors to the second fitting portion of the receptacle fitted to the optical plug is also determined by the dimensional accuracy realized in the mold dies.

DETAILED DESCRIPTION OF THE PREFERRED EMBODIMENTS

The preferred embodiments of the present invention will be described with reference to FIGS. 5 through 12.

Figure 1:
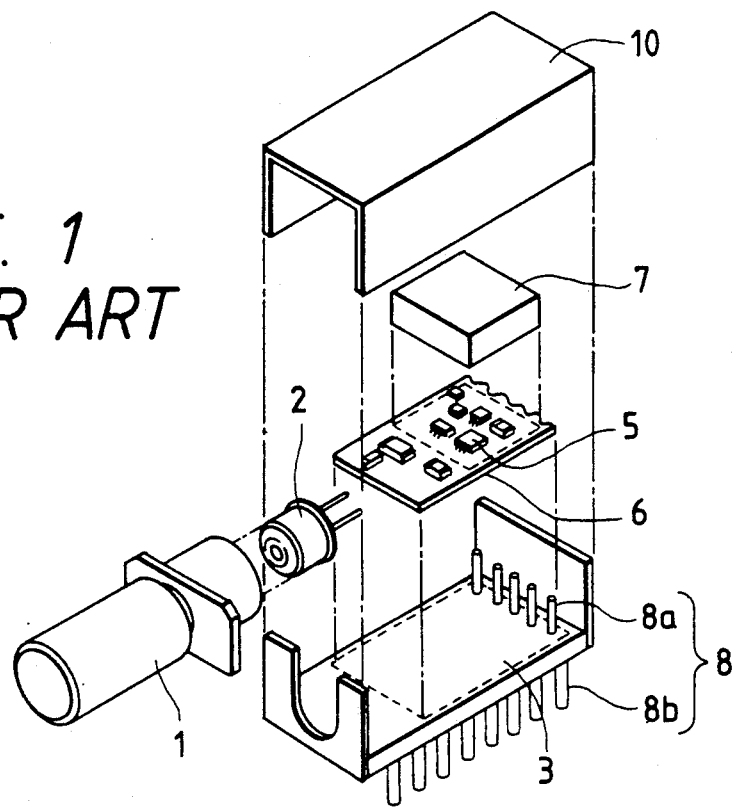
FIG. 1 is an exploded view showing a conventional single-core optical sub-module.
Figure 2:
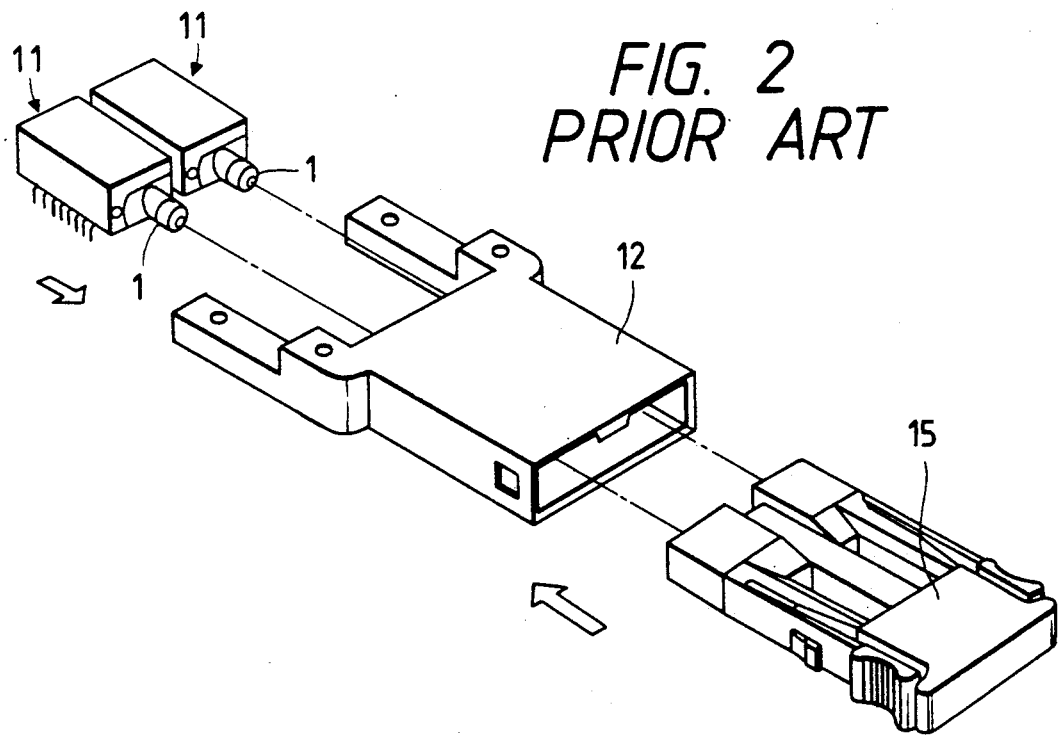
FIGS. 2 and 3 are views showing a conventional multi-core optical module and an alignment tool.
Figure 3:
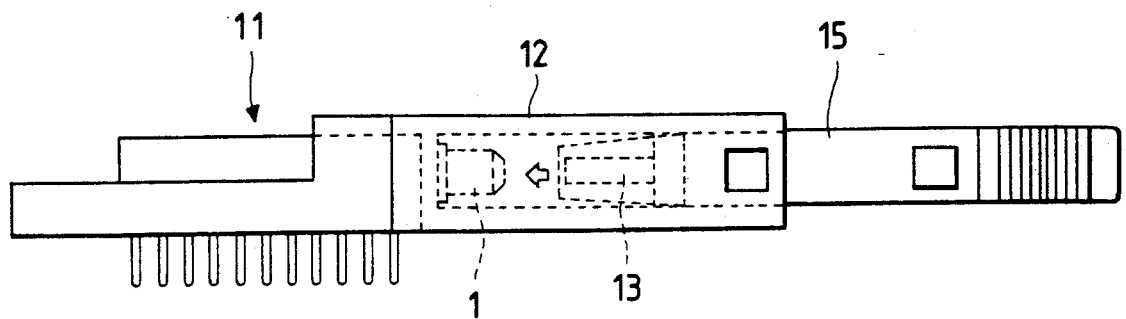
Figure 4:
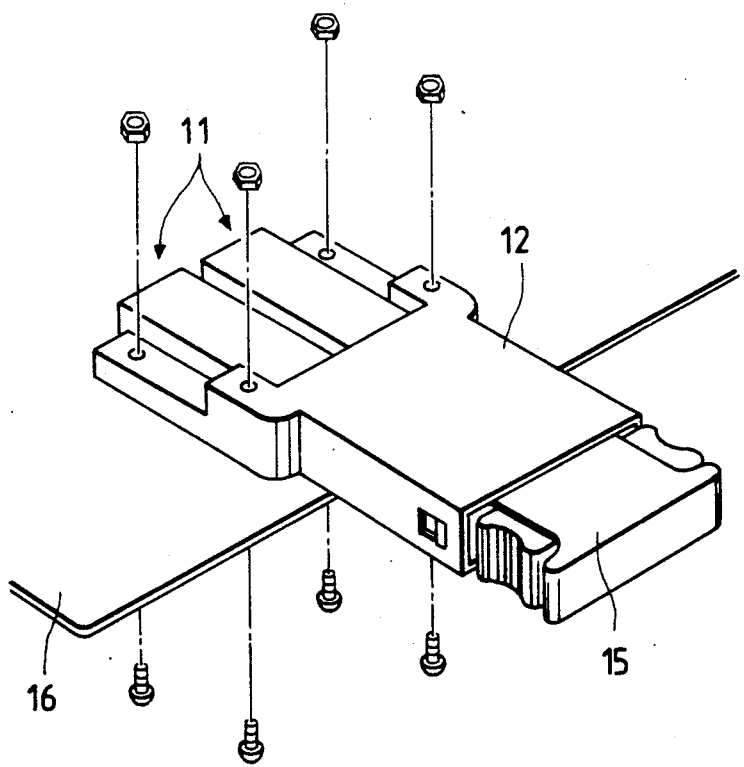
FIG. 4 is a view showing the step of mounting a conventional multi-core optical module to a printed circuit board.
Figure 5:
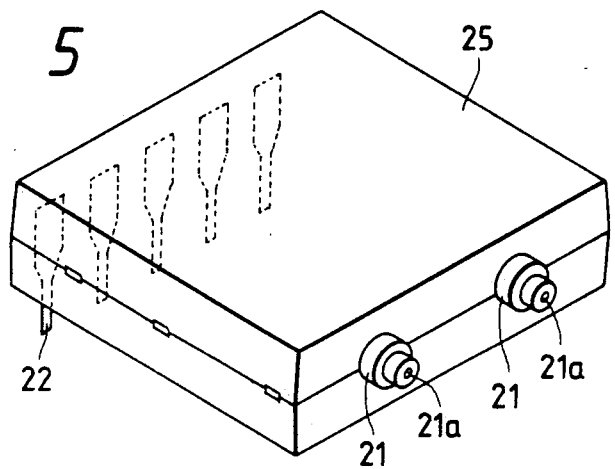
FIG. 5 is a perspective view showing an optical sub-module of the present invention.

FIG. 5 shows one example of an optical sub-module according to the present invention. As shown in the drawing, in the optical sub-module, parts for constituting the sub-module such as optical connectors 21, lead pins 22 are held by an insulative molding resin member 25 in a body.

Although FIG. 5 does not show, parts for constituting the sub-module except for the optical connectors 21 and the lead pins 22, that is, optical operation elements fixed to the optical connectors 21, electronic circuit portion electrically connected to the optical operation elements and the lead pins 22, respectively, electronic circuit parts constituting the electronic circuit portion, and the substrate for supporting the electronic circuit portion are held inside the molding resin member 25.

The structure and the process of the optical sub-module shown in FIG. 5 will be described with reference to FIGS. 6 to 9.

Figure 6:
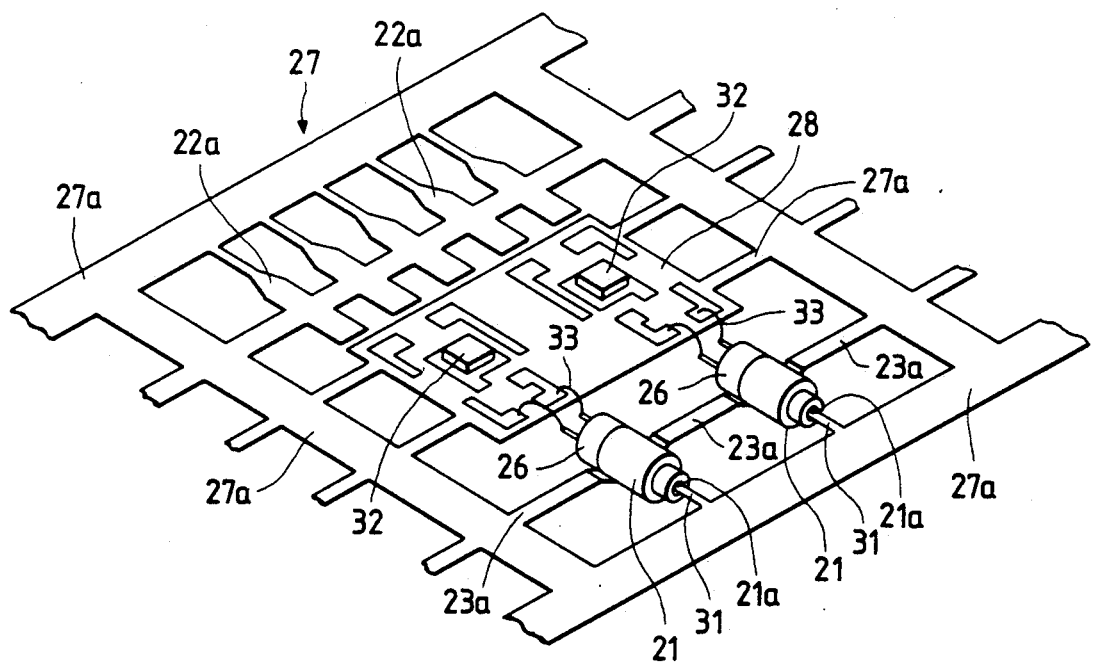
FIG. 6 is a perspective view showing an optical sub-module of the present invention before resin molding.
Figure 7:
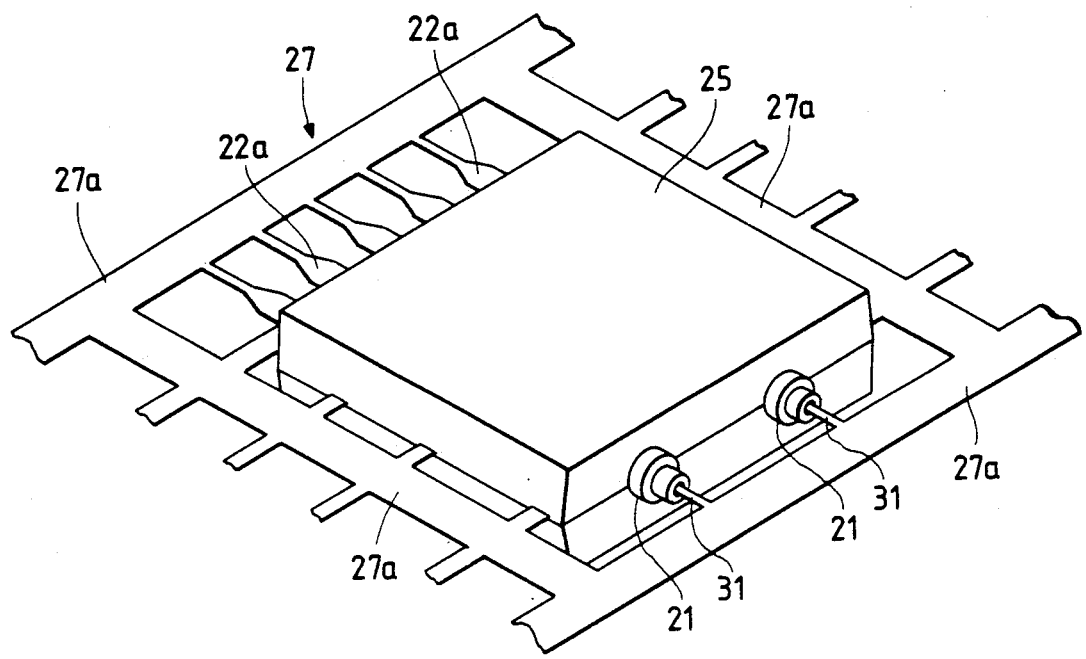
FIG. 7 is a perspective view showing an optical sub-module of the present invention after resin molding.
Figure 8:
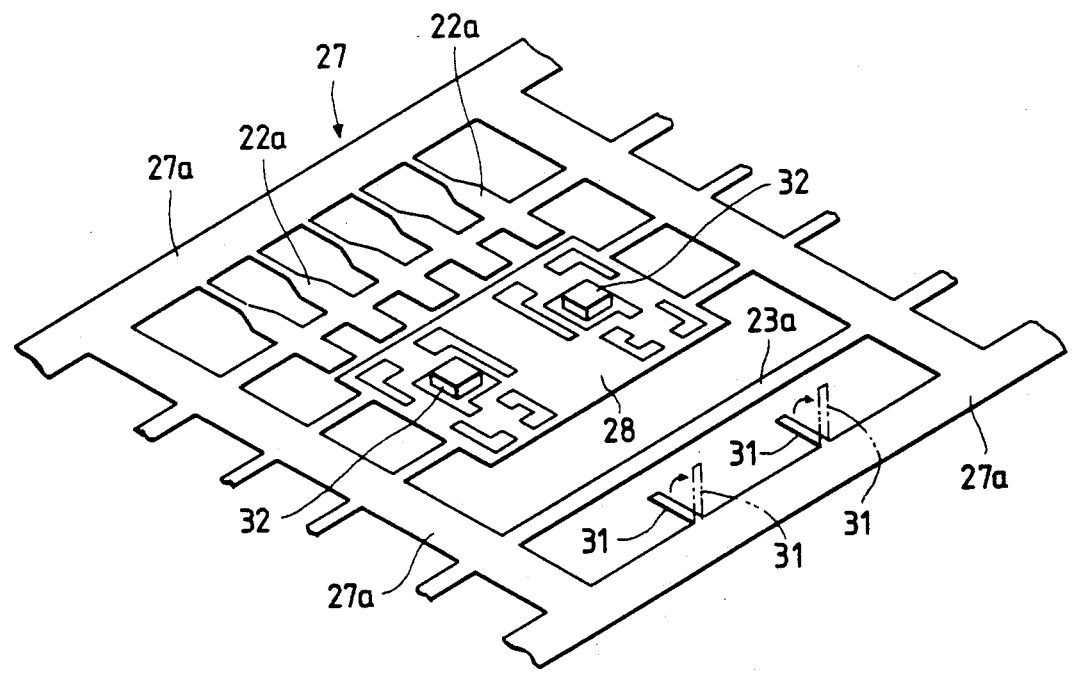
FIG. 8 is a perspective view showing a lead frame supporting an electronic circuit portion on a substrate formation portion.

FIG. 6 shows the state before parts constituting the optical sub-module such as optical connectors are resin molded. FIG. 7 shows the state after parts constituting the optical sub-module such as optical connectors are resin molded. FIG. 8 shows a lead frame 27 before the optical connectors 21 are held.

The process of producing the optical sub-module of the present invention will be described.

First, as shown in FIG. 6, after the optical axis of the optical operation elements 26 such as laser diodes or photodiodes are aligned, they are fixed to the optical connectors 21 by welding and the like.

Next, a lead frame 27 is prepared. As shown in FIG. 8, the lead frame includes lead pin formation portions 22a formed into the lead pins 22, frame portions 27a supporting the portions 22a, a substrate formation portion 28 supported by the frame portions 27a or lead pin formation portions 22a, and a connector holding portion 23a for holding the optical connectors 21 at the outer side thereof. The entire lead frame 27 can be made at the same time by etching a thin plate of about 0.25 mm thickness made of Fe-42% Ni alloy or copper, or by punching the thin plate using a press machine. Alternatively, after the substrate formation portion 28 and the connector holding portion 23a, and other parts are separately formed, the substrate formation portion 28 is fixed to tip ends of the lead pin formation portions 22a or the frame portions 27a by welding or the like, and the connector holding portion 23a is fixed to the frame portions 27a by welding or the like, so that the lead frame 27 is formed. Further, as described below, the lead frame 27 is provided with holder bars 31 for holding the optical connectors 21 which are inserted into ferrule insertion holes of the optical connectors 21.

An insulation film of alumina ($Al_2O_3$) or the like is formed on the surface of the substrate formation portion 28, and conductive wiring patterns including bonding pads are formed on the insulation film by aluminum and the like. The electronic circuit parts such as bare chip ICs 32 are mounted on the substrate formation portion 28 with the wiring patterns by die-bonding and the like, and wire-bonded to the wiring patterns, so that the electronic circuit portion is formed. As is understood from the above, the substrate formation portion 28 serves as a substrate for supporting the electronic circuit parts of the bare chip ICs 32 and the like.

After the electronic circuit parts are mounted on the substrate formation portion 28, the holder bars 31 are bent upward as shown by two dot chain line in FIG. 8. At the same time, two portions of the connector holding portion 23a are transformed by a press machine, etc. to correspond to the outer shape of the optical connector 21. When the connector holding portion 23a is formed separately from the frame portions 27a and then fixed to the frame portion 27a, the two portions of the connector holding portion 23a are previously formed to correspond to the outer shape of the optical connector.

The bent holder bars 31 as shown by the two dot chain line in FIG. 8 are inserted into the ferrule insertion holes 21a of the optical connectors 21 to which the optical operation elements 26 are fixed (FIGS. 6 and 7). Thus, the width of the holder bars 31 is smaller than that of the inner diameter of the ferrule insertion holes 21a. The holding bars 31 are returned to the original position while inserted in the ferrule insertion holes 21a of the optical connectors 21. As a result, as shown in FIG. 6, the optical connectors 21 are held by the connector holding portion 23a.

After the optical connectors 21 are held by the connector holding portion 23a, the electronic circuit portion formed on the substrate 28 is connected to the lead pin formation portions 22a by wire-bonding. Further, as shown in FIG. 6, the electronic circuit portion and the terminals of the optical operation elements 26 are electrically connected by wires 33.

Thereafter, parts such as the lead frame 27 are mounted to the mold die for transfer molding as described below, and fluid molding resin is poured in the mold die, so that respective parts are held by the molding resin member 25 except for ends of the optical connectors 21 into which ends of the optical fibers are inserted and portions formed into the outer leads.

Figure 9:
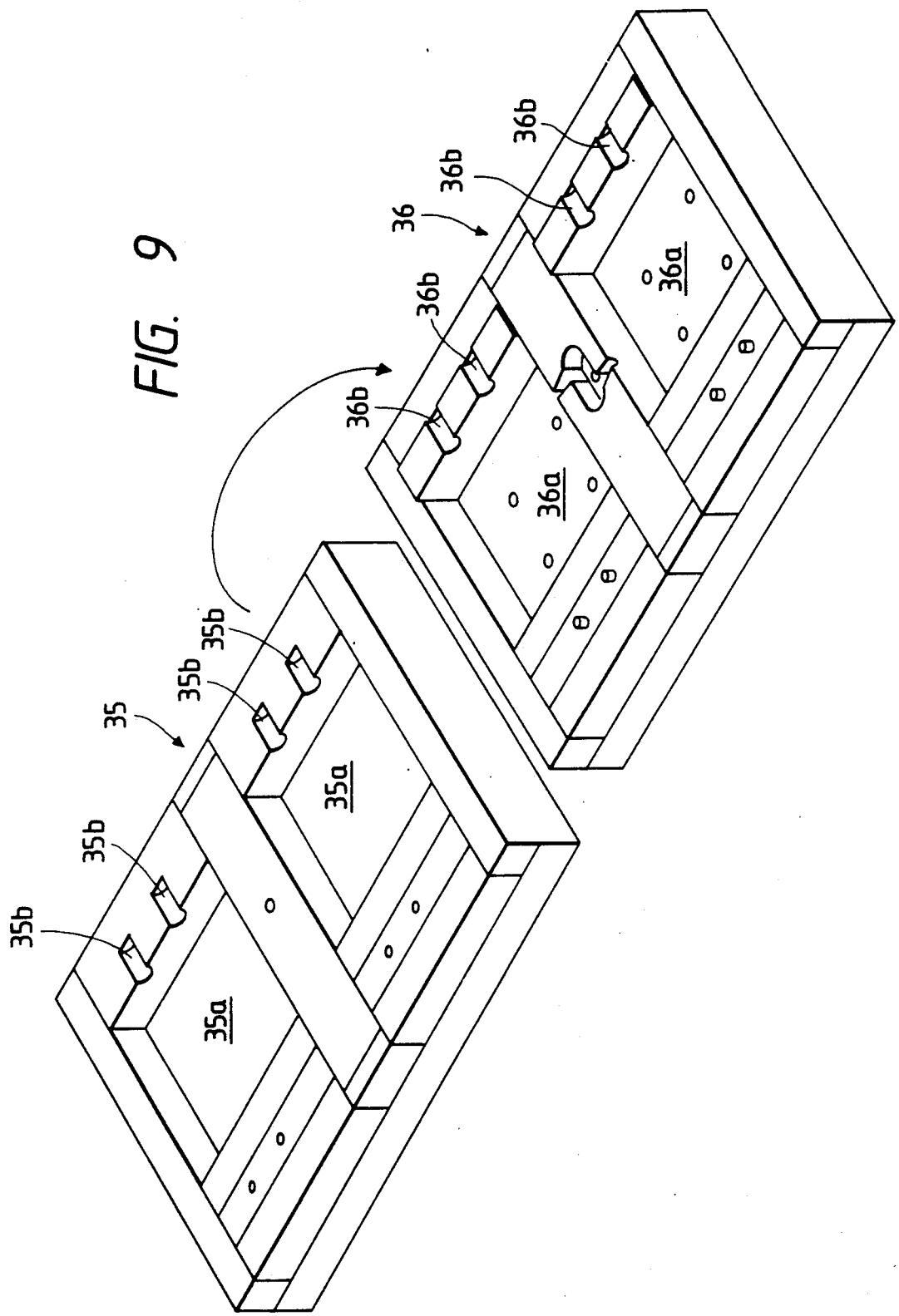
FIG. 9 is a perspective view showing a mold die for transfer molding used for forming an optical sub-module of the present invention.

FIG. 9 shows one example of a mold die for transfer molding which enables formation of two two-core optical sub-modules at the same time. As shown in the drawing, the mold die is composed of an upper mold die 35 and a lower mold die 36. In the opposed surfaces of the upper and the lower mold dies 35 and 36, two cavities 35a and two cavities 36a are respectively formed. A pair of semicylindrical recess portions 35b and a pair of semicylindrical recess portions 36b are formed to communicate with each of the cavities 35a and 36a. When parts such as the lead frame 27 are mounted to the mold die in such a way that the parts are held between the upper mold die 35 and the lower mold die 36, one end of each optical connector 21 at which an end of an optical fiber is received, is closely fitted in the recess portions 35b and 36b. That is, a pair of optical connectors are fitted in the recess portions 35b and 36b, so that the relative positional relation of the optical connectors is precisely determined. The technical level of manufacturing the mold die is so high that very high dimensional accuracy can be attained, since if a gap is formed between the upper and the lower mold dies, such problems that molding resin protrudes from the gap are caused. Thus, the dimensional accuracy required between a pair of optical connectors 21 in the optical sub-module is also sufficiently satisfied.

Accordingly, if the recess portions 35b and 36b are formed with the dimensional accuracy required for the relative positional relation between a pair of optical connectors 21 in the optical sub-module, the sub-module can also be made with high accuracy by mounting parts such as the lead frame 27 to the mold die, pouring the molding resin into the cavities in the mold die, and molding the resin.

In the above described process of producing the optical sub-module, steps of forming single-core optical sub-modules and combining the single-core optical sub-modules can be eliminated.

Further, the molding resin member 25 formed by transfer molding is molded under a high pressure as in the case of sealing common ICs and the like, so that good sealing property can be attained. Thus, a lid and a cover for sealing the bare chip ICs used at the formation of the conventional single-core optical sub-module can be eliminated. Further, since inexpensive resin as compared with a conventional ceramic package is used for packaging, packaging costs are decreased.

In the process of producing the optical sub-module according to the present invention, the optical connectors 21 are held by the connector holding portion 23a of the lead frame 27 and the holder bars 31, so that it is possible to prevent the movement of the optical connectors 21 relative to the lead frame 27 during the handling such as transportation from the wire-bonding to mounting of the parts to the mold die. Accordingly, it is possible to eliminate the possibility of breakage of the wires 33 connecting the terminals of the optical operation elements 26 fixed to the optical connectors 21 to the bonding pads on the substrate formation portion 28 due to the movement of the optical connectors 21. Therefore, manufacturing yield is improved and reliability of the optical sub-module is improved.

After resin molding, unnecessary portions of the lead frame 27 are cut away by a press machine and remaining lead pin formation portions are formed into the outer leads, so that the optical sub-module is obtained as shown in FIG. 5. The outer leads are formed by cutting away the unnecessary portions of the lead frame and bending the remaining portions after resin molding.

In the above embodiment, a portion of the connector holding portion 23a extruding from the molding resin member 25 are cut away. However, if the portion is left like the outer leads and fixed to a fixed object such as a printed circuit board by soldering and the like, the optical sub-module can be strongly fixed to the fixed object such as the printed circuit board.

In the above embodiment, although two-core optical sub-module including two optical connectors are exemplified, the present invention is applicable to a multi-core optical sub-module including more than three optical connectors, as well as a single-core optical sub-module including a single optical connector.

As described above, in the optical sub-module of the present invention, manufacturing steps are simplified. Further, due to the structure that parts are held by the inexpensive molding resin member formed by transfer molding, a plurality of optical sub-modules can be made at the same time and mass-produced. Accordingly, it is possible to provide the optical sub-module at a low cost and in mass-production as compared with the prior art.

When a multi-core optical sub-module is formed by the above described method, since a plurality of optical connectors are fixed by the molding resin member, the multi-core optical sub-module can be mounted on the fixed object such as a printed circuit board without distortion of the relative positional relation between the optical connectors even if an alignment tool is not used, so that the working efficiency of mounting is improved.

When the single-core optical sub-module is formed by the above described method, it is also possible to provide the sub-module with advantages that cost of parts is decreased, manufacturing cost is decreased, and dimensional accuracy is improved.

Next, an optical module comprising the above optical sub-module and a receptacle will be described with reference to FIGS. 10 to 12.

Figure 10:
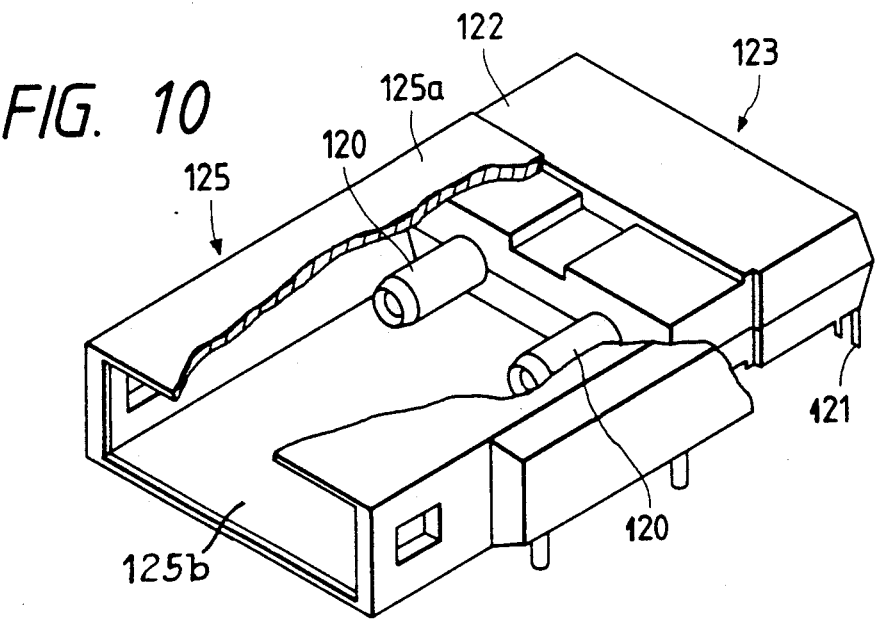
FIG. 10 is a perspective view showing an optical module of the present invention.
Figure 11:
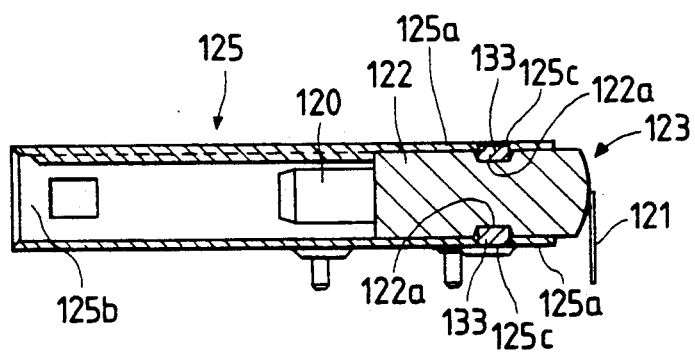
FIG. 11 is a sectional view showing an optical module of the present/invention.
Figure 12:
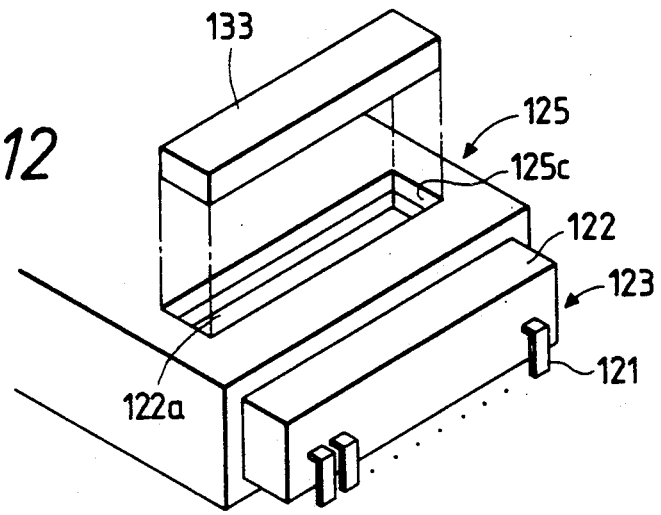
FIG. 12 is a partially perspective view showing a fitting portion of the sub-module and a receptacle.

FIGS. 10 and 11 respectively show a two-core optical module embodying the present invention. In the illustrated two-core optical module, two optical connectors 120 for receiving ends of respective optical fibers (not shown) at ends of the connectors, as well as lead pins 121, are integrally held by a molding resin member 122 to provide an optical sub-module 123. The sub-module 123 is fitted to a first fitting portion 125a of a receptacle 125. The sub-module 123 is fitted to the receptacle 125 in such a manner that the optical connectors 120 held by the molding resin member 122 are inserted in the receptacle 125, and in order to make this fitting firm, an adhesive is beforehand applied to the fitting portions.

The sub-module 123 is produced through the transfer molding as described above. Thus, the dimensional accuracy of the intervals between the optical connectors 120 integrally held by the molding resin member 122 are determined by the dimensional accuracy realized in the mold die used for the molding of the sub-module. Also the dimensional accuracy of the external shape of the molding resin member 122, as well as the position of each optical connector 120 relative to the external shape of the molding resin member 122, is determined by the dimensional accuracy realized in the mold die.

The receptacle 125 to be fitted to the sub-module 123 can also be produced by pouring a fluid molding resin into a mold die for the transfer molding or the injection molding and by effecting the molding under a predetermined pressure. As shown in FIGS. 10 and 11, the generally tubular receptacle 125 thus obtained has the first fitting portion 125a adapted to fit to the molding resin member 122, and a second fitting portion 125b communicating with the first fitting portion 125a and adapted to fit to an optical plug (not shown) holding the ends of the optical fibers.

As in the sub-module 123, the dimensional accuracy of the various portions of the receptacle 125 are determined by the dimensional accuracy realized in the mold die used for the molding of the receptacle 125.

The technique of manufacturing the mold die has now reached a level achieving very high dimensional accuracy, and sufficiently satisfies the dimensional accuracy required for the various parts of the sub-module 123 and the receptacle 125. Therefore, the sub-module 123 and the receptacle 125 both having high dimensional accuracy can be mass-produced by the resin molding with a high level of reproduction.

As described above, in the multi-core optical module according to the present invention, the molding resin member 122 holding the optical connectors 120, as well as the receptacle 125, are formed by the resin molding, and the two members are fitted relative to each other. Therefore, the accuracy of the relative position between the first and second fitting portions 125a and 125b of the receptacle 125 is determined by the high dimensional accuracy realized in the mold die, and fitting portions of the molding resin member 122 and the receptacle 125 are formed precisely due to the high dimensional accuracy realized in the respective mold dies. As a result, merely by fitting the molding resin member 122 to the first fitting portion 125a of the receptacle 125 as shown in FIG. 10, the positioning of the optical connectors 120 relative to the second fitting portion 125b of the receptacle 125 for receiving the optical plug can be achieved highly precisely, thus constituting the optical module without the use of any alignment tool necessary for the prior art. Further, the optical module can be mounted on a fixed object such as a printed circuit board, without the use of the alignment tool. The strength of connection between the molding resin member 122 and the receptacle 125 is increased by applying an adhesive to fitting portions of the two members before this fitting is effected. When it is desired to further increase such connection strength, recesses 122a are formed in the molding resin member 122, and through holes 125c are formed through the receptacle 125 in such a manner that the through holes 125c can be disposed to coincide with the recesses 122a, respectively. After the molding resin member 122 is fitted to the receptacle 125, an adhesive is applied to each through hole 125c and each recess 122a, and then fixing plates 133 are inserted and fixed to the hole 125c and recess 122a. By doing so, the fixing plates 133 serve as stoppers for preventing a relative movement between the sub-module 123 and the receptacle 125, and therefore when the load is applied to the sub-module 123 upon insertion of the optical plug into the receptacle 125, the sub-module 123 will not be moved relative to the receptacle 125 in the direction of insertion of the optical plug, thereby preventing the disengagement of the sub-module 123 from the receptacle 125. In the above embodiment, although the receptacle 125 is formed by the resin molding, the receptacle 125 can be formed by die casting or lost wax casting of molten metal, or by the molding using the sintering of metal powder. When the receptacle is formed by such metal casting or molding, the dimensional accuracy is lower than that achieved by the resin molding; however, such lower dimensional accuracy of the receptacle can be sufficiently covered by the improved dimensional accuracy of the molding resin member 122.

As described above, in the present invention, the molding resin member holding the optical connectors, as well as the receptacle fitting to the molding resin member, is so molded as to have high dimensional accuracy, and therefore there is no need to use an alignment tool as is the case with the prior art, and merely by fitting the two members relative to each other, there can be provided the optical module which can be mounted efficiently and can be manufactured on a mass-production basis at low costs.

What is claimed is:

1. A process of producing an optical sub-module, comprising the steps of:
  preparing a lead frame including a substrate formation portion formed into a substrate and lead pin formation portions formed into lead pins;
  forming an electronic circuit portion by mounting electronic circuit parts on said substrate formation portion;
  electrically connecting at least one optical operation element fixed to an optical connector and portions of said lead frame formed into inner leads to said electronic circuit portion;
  holding said optical connector, said optical operation element, said electronic circuit parts, and said lead frame by a molding resin member integrally except for one end of said optical connector and portions of said lead frame formed into outer leads;

cutting away portions of said lead frame so that it has a predetermined shape; and bending said outer leads into a predetermined shape.

2. A process of producing an optical sub-module as claimed in claim 1, further comprising the step of holding said optical connector by a connector holding portion and a holder bar of said lead frame before the electrically connecting step.

3. A process of producing an optical module, comprising the steps of:

preparing a lead frame including a substrate formation portion formed into a substrate and lead pin formation portions formed into lead pins;

forming an electronic circuit portion by mounting electronic circuit parts on said substrate formation portion;

electrically connecting at least one optical operation element fixed to an optical connector and portions of said lead frame formed into inner leads to said electronic circuit portion;

holding said optical connector, said optical operation element, said electronic circuit parts, and said lead frame by a molding resin member integrally except for one end of said optical connector and portions of said lead frame formed into outer leads;

cutting away portions of said lead frame so that it has a predetermined shape;

bending said outer leads into predetermined shape so as to form a sub-module; and fitting said sub-module to a receptacle.

4. A process of producing an optical module as claimed in claim 3, further comprising the step of holding said optical connector by a connector holding portion and a holder bar of said lead frame before the electrically connecting step.

* * * * *